(12) United States Patent
Ito

(10) Patent No.: US 12,552,361 B2
(45) Date of Patent: Feb. 17, 2026

(54) HYBRID VEHICLE

(71) Applicant: SUBARU CORPORATION, Tokyo (JP)

(72) Inventor: Kosei Ito, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 236 days.

(21) Appl. No.: 18/459,682

(22) Filed: Sep. 1, 2023

(65) Prior Publication Data

US 2024/0101103 A1  Mar. 28, 2024

(30) Foreign Application Priority Data

Sep. 22, 2022 (JP) ................. 2022-151853

(51) Int. Cl.
*B60W 20/40* (2016.01)

(52) U.S. Cl.
CPC ..... *B60W 20/40* (2013.01); *B60W 2510/0233* (2013.01); *B60W 2510/1075* (2013.01)

(58) Field of Classification Search
CPC ......... B60W 20/40; B60W 2510/0233; B60W 2510/1075; Y02T 10/62
USPC ........................................................ 701/22
See application file for complete search history.

(56) References Cited

U.S. PATENT DOCUMENTS

2019/0291713 A1* 9/2019 Kogure ................ B60W 10/06
2022/0234436 A1* 7/2022 Nishihiro ................ B60L 50/10

FOREIGN PATENT DOCUMENTS

JP      2016061348 A  *  4/2016
WO  WO-2019062880 A1  *  4/2019  ............... B60K 6/24

* cited by examiner

*Primary Examiner* — Helal A Algahaim
*Assistant Examiner* — Leah N Miller
(74) *Attorney, Agent, or Firm* — Rimon P.C.

(57) ABSTRACT

A hybrid vehicle includes a forward-backward travel changeover mechanism including a forward clutch and a reverse brake, a continuously variable transmission, an engine, a motor generator, an output clutch, a mechanical oil pump, an electric oil pump, a manual valve, an oil passage, and a control unit. The manual valve supplies oil to the forward clutch when a parking range is selected. When a state of charge of a high voltage battery decreases to a predetermined value or lower in the parking range, the control unit disengages the output clutch, engages the forward clutch, and causes the engine to operate to drive the motor generator as a generator. When a backward traveling range is selected while power generation is being performed in the parking range, the control unit drives the electric oil pump, and supplies the oil to the output clutch or the reverse brake through the oil passage.

8 Claims, 6 Drawing Sheets

| RANGE | LOCK-UP CLUTCH | FORWARD CLUTCH | OUTPUT CLUTCH | TRANSFER CLUTCH | REVERSE BRAKE | POWER GENERATION | PARKING | EPB | VEHICLE |
|---|---|---|---|---|---|---|---|---|---|
| P | DIS-ENGAGED | DIS-ENGAGED | ENGAGED | ENGAGED | DIS-ENGAGED | NOT ALLOWED | LOCKED | | STOPPED |
| P (POWER GENE-RATION) | ENGAGED | ENGAGED | DIS-ENGAGED | ENGAGED | DIS-ENGAGED | ALLOWED | LOCKED | ON | STOPPED |
| R | DIS-ENGAGED | DIS-ENGAGED | ENGAGED | ENGAGED | ENGAGED | ALLOWED | FREE | | TRAVEL BACK-WARD |
| D | BASED ON VEHICLE SPEED | ENGAGED | ENGAGED | ENGAGED | DIS-ENGAGED | ALLOWED | FREE | | TRAVEL FORWARD |

| RANGE | LOCK-UP CLUTCH | FORWARD CLUTCH | OUTPUT CLUTCH | TRANSFER CLUTCH | REVERSE BRAKE | POWER GENE-RATION | PARKING | EPB | VEHICLE |
|---|---|---|---|---|---|---|---|---|---|
| P | DIS-ENGAGED | DIS-ENGAGED | ENGAGED | ENGAGED | DIS-ENGAGED | NOT ALLOWED | LOCKED | | STOPPED |
| P (POWER GENE-RATION) | ENGAGED | ENGAGED | DIS-ENGAGED | ENGAGED | DIS-ENGAGED | ALLOWED | LOCKED | ON | STOPPED |
| R | DIS-ENGAGED | DIS-ENGAGED | ENGAGED | ENGAGED | ENGAGED | ALLOWED | FREE | | TRAVEL BACK-WARD |
| D | BASED ON VEHICLE SPEED | ENGAGED | ENGAGED | ENGAGED | DIS-ENGAGED | ALLOWED | FREE | | TRAVEL FORWARD |

FIG. 4

HYBRID VEHICLE

CROSS-REFERENCE TO RELATED APPLICATIONS

The present application claims priority from Japanese Patent Application No. 2022-151853 filed on Sep. 22, 2022, the entire contents of which are hereby incorporated by reference.

BACKGROUND

The disclosure relates to a hybrid vehicle.

Recently, a hybrid vehicle (a hybrid electric vehicle (HEV)) that is able to effectively improve fuel economy of a vehicle by combination use of an engine and an electric motor has been widely put into practical use.

For example, Japanese Unexamined Patent Application Publication (JP-A) No. 2016-061348 discloses a hybrid vehicle in which a crankshaft of an engine is coupled to one end of a primary shaft (a primary pulley) of a continuously variable transmission via a torque converter and a forward-backward travel changeover mechanism. The torque converter includes a lock-up clutch. The forward-backward travel changeover mechanism includes a forward clutch and a reverse brake. Another end of the primary shaft of the continuously variable transmission and an input/output shaft of a motor generator (an electric motor) are coupled to each other. A secondary shaft (a secondary pulley) of the continuously variable transmission is coupled to a front wheel via an output clutch.

SUMMARY

An aspect of the disclosure provides a hybrid vehicle that includes a forward-backward travel changeover mechanism, a continuously variable transmission, an engine, a motor generator, an output clutch, a driving wheel, a mechanical oil pump, an electric oil pump, a manual valve, an oil passage, and a control unit. The forward-backward travel changeover mechanism includes a forward clutch and a reverse brake. The continuously variable transmission includes a primary shaft and a secondary shaft. The engine is coupled to a first end of the primary shaft of the continuously variable transmission via the forward-backward travel changeover mechanism. The motor generator is coupled to a second end of the primary shaft of the continuously variable transmission. The driving wheel is coupled to the secondary shaft of the continuously variable transmission via the output clutch. The mechanical oil pump is configured to be driven by the engine and the motor generator and to boost a pressure of oil and discharge the oil. The electric oil pump is configured to be driven by an electric motor and to discharge the oil through a first check valve. The first check valve is configured to open when a discharge pressure of the electric oil pump is higher than a discharge pressure of the mechanical oil pump. The manual valve is configured to switch supply of the oil to the forward clutch and the reverse brake in accordance with a shift operation state. The oil passage is configured to allow for communication between the electric oil pump and the output clutch or the reverse brake. The control unit is configured to control driving of the engine, driving of the motor generator, driving of the electric oil pump, engagement and disengagement of the forward clutch, engagement and disengagement of the reverse brake, and engagement and disengagement of the output clutch. The manual valve is configured to supply the oil to the forward clutch when a parking range is selected. The control unit is configured to, when a state of charge of a high voltage battery decreases to a predetermined value or lower in the parking range, disengage the output clutch, engage the forward clutch, and cause the engine to operate to drive the motor generator as a generator. The control unit is configured to, when a backward traveling range is selected while power generation is being performed in the parking range, drive the electric oil pump, and supply the oil to the output clutch or the reverse brake through the oil passage.

An aspect of the disclosure provides a hybrid vehicle that includes a forward-backward travel changeover mechanism, a continuously variable transmission, an engine, a motor generator, an output clutch, a driving wheel, a mechanical oil pump, an electric oil pump, a manual valve, an oil passage, and circuitry. The forward-backward travel changeover mechanism includes a forward clutch and a reverse brake. The continuously variable transmission includes a primary shaft and a secondary shaft. The engine is coupled to a first end of the primary shaft of the continuously variable transmission via the forward-backward travel changeover mechanism. The motor generator is coupled to a second end of the primary shaft of the continuously variable transmission. The driving wheel is coupled to the secondary shaft of the continuously variable transmission via the output clutch. The mechanical oil pump is configured to be driven by the engine and the motor generator and to boost a pressure of oil and discharge the oil. The electric oil pump is configured to be driven by an electric motor and to discharge the oil through a first check valve. The first check valve is configured to open when a discharge pressure of the electric oil pump is higher than a discharge pressure of the mechanical oil pump. The manual valve is configured to switch supply of the oil to the forward clutch and the reverse brake in accordance with a shift operation state. The oil passage is configured to allow for communication between the electric oil pump and the output clutch or the reverse brake. The circuitry is configured to control driving of the engine, driving of the motor generator, driving of the electric oil pump, engagement and disengagement of the forward clutch, engagement and disengagement of the reverse brake, and engagement and disengagement of the output clutch. The manual valve is configured to supply the oil to the forward clutch when a parking range is selected. The circuitry is configured to, when a state of charge of a high voltage battery decreases to a predetermined value or lower in the parking range, disengage the output clutch, engage the forward clutch, and cause the engine to operate to drive the motor generator as a generator. The control unit is configured to, when a backward traveling range is selected while power generation is being performed in the parking range, drive the electric oil pump, and supply the oil to the output clutch or the reverse brake through the oil passage.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 4 is an engagement table describing an engaged/disengaged state of each of a lock-up clutch, the forward clutch, the output clutch, a transfer clutch, and the reverse brake in each of a P-range state, the P-range power generation state, the R-range state, and a D-range state.

DETAILED DESCRIPTION

Figure 1:
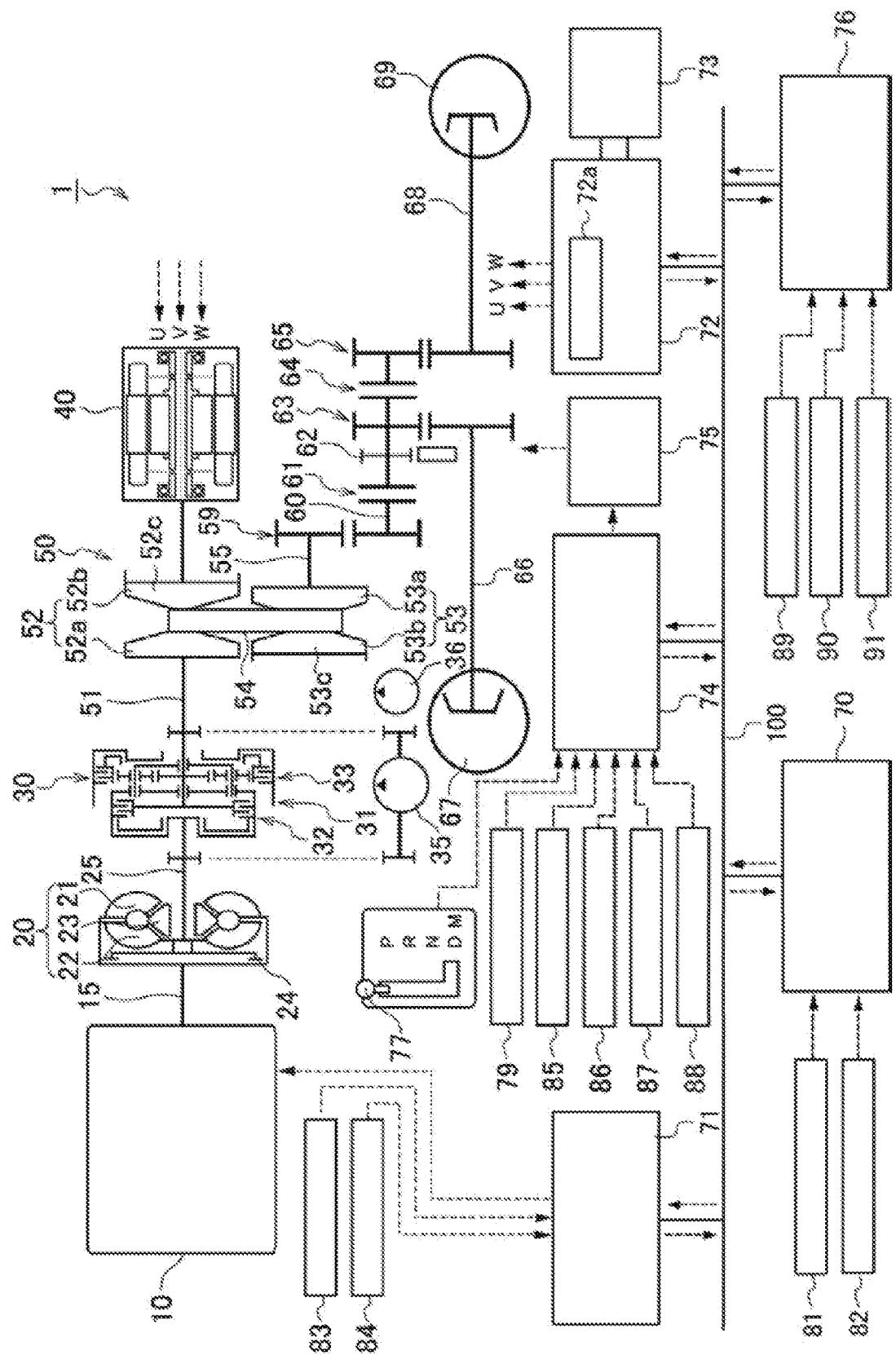
FIG. 1 is a block diagram illustrating a configuration of a hybrid vehicle according to one example embodiment of the disclosure.

Regarding a hybrid vehicle having a configuration disclosed in JP-A No. 2016-061348, for example, when a state of charge (SOC) of a high voltage battery decreases due to power consumption by electric equipment such as an air conditioner while the hybrid vehicle is parked in a parking range (a P range), it may be desired to drive a motor generator by an engine to generate power, that is, to charge the high voltage battery. In other words, it may be desired to perform power generation in the P range. Hereinafter, power generation in the P range is sometimes referred to as "P-range power generation".

However, in the hybrid vehicle disclosed in JP-A No. 2016-061348, a forward clutch and a reverse brake are both disengaged in the P range. This prevents driving of the motor generator by the engine, therefore preventing power generation (the P-range power generation).

To address this, in order to allow for the P-range power generation, for example, the forward clutch may be engaged, the reverse brake may be disengaged, and the output clutch may be disengaged in the P range. That is, the motor generator may be able to be driven by the engine, and transmission of driving force to a front wheel may be prevented. In such a case, if switching is performed from the P range to a reverse range (an R range, which is a backward traveling range), i.e., if a shift operation is performed, while the P-range power generation is being performed, a delay in response to a shift operation can occur, due to an increase in number of clutches to be engaged, as compared with when switching is performed from the P range to the R range or a drive range (a D range, which is a frontward traveling range) in a normal situation, that is, in a situation where the P-range power generation is not performed. Regarding the increase in number of clutches to be engaged described above, for example, the increase in number of clutches may refer to having two systems. The additional clutch to be engaged described above may be, for example, an output clutch. For example, engagement of such clutches may be supplying of oil, in other words. The above-described delay in response to the shift operation can give a strange feeling to a driver who drives the hybrid vehicle.

It is desirable to provide a hybrid vehicle that makes it possible to prevent occurrence of a delay in response to a shift operation even when power generation using a motor generator in a parking (P) range (P-range power generation) is allowed and switching to an R range or a D range is performed while the P-range power generation is being performed, i.e., a shift operation is performed. In the hybrid vehicle, an engine is coupled to one end of a primary shaft of a continuously variable transmission via a forward-backward travel changeover mechanism, another end of the primary shaft of the continuously variable transmission and the motor generator are coupled to each other, and a secondary shaft of the continuously variable transmission is coupled to a driving wheel via an output clutch. The forward-backward travel changeover mechanism includes a forward clutch and a reverse brake.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Figure 2:
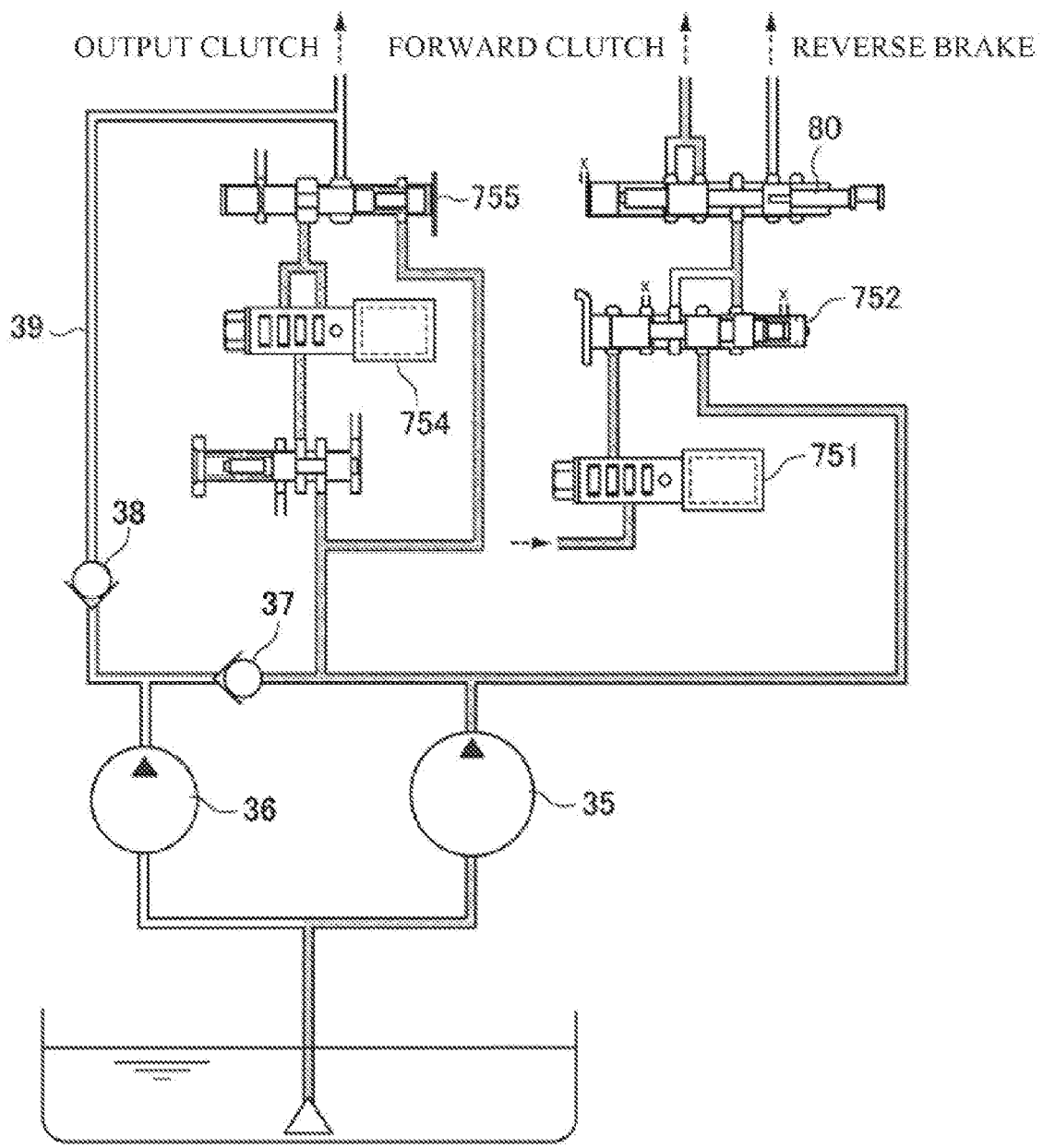
FIG. 2 is a diagram illustrating a configuration of an oil pressure circuit (in a P-range power generation state) that supplies an oil pressure to a forward-backward travel changeover mechanism (a forward clutch and a reverse brake) and an output clutch.
Figure 3:
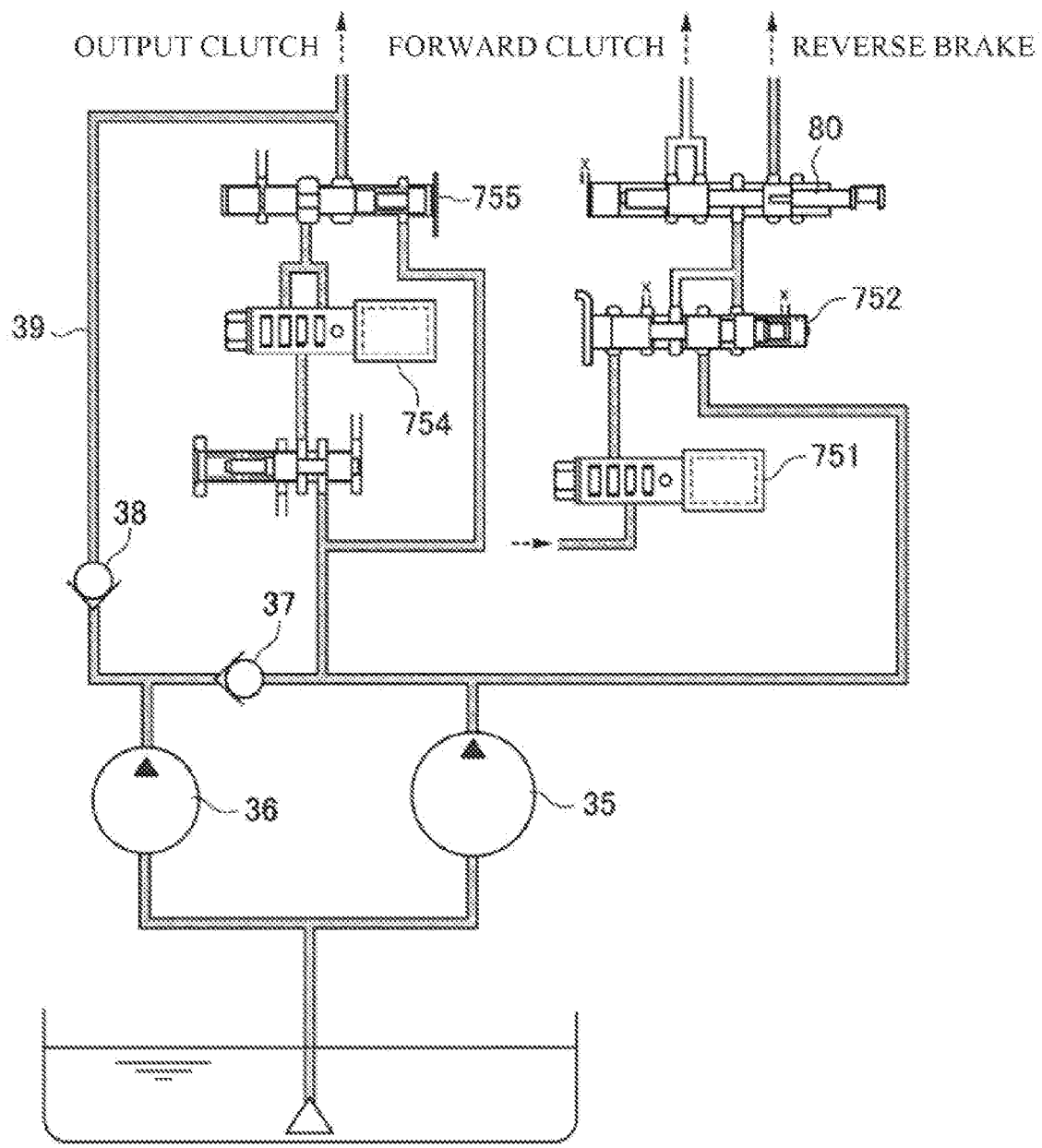
FIG. 3 is a diagram illustrating a configuration of the oil pressure circuit (in an R-range state) that supplies the oil pressure to the forward-backward travel changeover mechanism (the forward clutch and the reverse brake) and the output clutch.

First, with reference to FIGS. 1 to 4 together, a description is provided of a configuration of a hybrid vehicle 1 according to an example embodiment of the disclosure. FIG. 1 is a block diagram illustrating the configuration of the hybrid vehicle 1. FIG. 2 is a diagram illustrating a configuration (a P-range power generation state) of an oil pressure circuit that allows for supply of an oil pressure to a forward-backward travel changeover mechanism 30 (a forward clutch 32 and a reverse brake 33) and an output clutch 61. FIG. 3 is a diagram illustrating a configuration (an R range state) of the oil pressure circuit. FIG. 4 is an engagement table describing an engaged/disengaged state of each of a lock-up clutch 24, the forward clutch 32, the output clutch 61, a transfer clutch 64, and the reverse brake 33 in each of a P-range state, the P-range power generation state, an R-range state, and a D-range state.

An engine 10 may be of any type, and may be, for example, a horizontally opposed direct-injection four-cylinder gasoline engine. In the engine 10, intake air from an unillustrated air cleaner may be throttled by an electronically controlled throttle valve provided in an intake pipe, may pass through an intake manifold, and may be taken into cylinders each included in the engine 10. An amount of the intake air from the air cleaner may be detected by an air flow meter 83. Further, a throttle angle sensor may be disposed at the throttle valve. The throttle angle sensor may detect an opening degree of the throttle valve. An injector may be attached to each of the cylinders. The injector may inject fuel. Further, an ignition plug and an igniter-built-in coil may be attached to each of the cylinders. The ignition plug may ignite an air-fuel mixture. The igniter-built-in coil may apply high voltage to the ignition plug. In each of the cylinders of the engine 10, the air-fuel mixture of the intake air and the fuel injected by the injector may be ignited by the ignition plug and combusted. The exhaust gas generated by the combustion may be discharged through an exhaust pipe.

In addition to the air flow meter 83 and the throttle angle sensor described above, a cam angle sensor may be attached near a camshaft of the engine 10. The cam angle sensor may perform cylinder determination of the engine 10. In addition, a crank angle sensor 84 may be attached near a crankshaft 15 of the engine 10. The crank angle sensor 84 may detect a rotational position (a rotational speed) of the crankshaft 15. These sensors may be coupled to an engine control unit 71 which will be described later. Hereinafter, the engine control unit may be referred to as an "ECU". In addition, various other sensors may be coupled to the ECU 71. Non-limiting examples of such various other sensors may include a coolant temperature sensor that detects a temperature of a coolant of the engine 10.

A continuously variable transmission 50 may be coupled to the crankshaft 15 of the engine 10 via a torque converter 20 and the forward-backward travel changeover mechanism 30. The torque converter 20 may serve as both a clutch and a torque multiplier. The continuously variable transmission 50 may convert driving force from the engine 10, and may output the converted driving force.

The torque converter 20 may include, for example but not limited to, a pump impeller 21, a turbine runner 22, a stator 23, and a turbine shaft 25. The pump impeller 21 may be coupled to the crankshaft 15. The pump impeller 21 may generate an oil flow. The turbine runner 22 may be opposed to the pump impeller 21. The turbine runner 22 may receive power of the engine 10 via the oil, and may drive the turbine shaft 25. The stator 23 may be positioned between the pump impeller 21 and the turbine runner 22. The stator 23 may alter the oil flow exhausted or returned from the turbine runner 22, and may return the oil flow to the pump impeller 21, thereby allowing for torque multiplication.

The torque converter 20 may further include the lock-up clutch 24. The lock-up clutch 24 may bring an input and an output into a directly coupled state. When the lock-up clutch 24 is in a disengaged state (a non-lock-up state), the torque converter 20 may perform torque multiplication on driving force of the engine 10, and may transmit the driving force to the continuously variable transmission 50. When the lock-up clutch 24 is in an engaged state (a lock-up state), the torque converter 20 may directly transmit the driving force of the engine 10 to the continuously variable transmission 50. Note that, when power generation is performed in the P range (the parking range), the lock-up clutch 24 may be engaged. This will be described later in further detail. A rotational speed (a turbine rotational speed) of the turbine runner 22 included in the torque converter 20 may be detected by a turbine rotation sensor 87. The turbine rotational speed detected by the turbine rotation sensor 87 may be supplied to a transmission control unit 74 which will be described later. Hereinafter, the transmission control unit may be referred to as a "TCU".

The forward-backward travel changeover mechanism 30 may perform switching between forward rotation of a driving wheel and reverse rotation of the driving wheel, i.e., switching between forward traveling of the hybrid vehicle 1 and backward traveling of the hybrid vehicle 1. The forward-backward travel changeover mechanism 30 may include, for example but not limited to, a planetary gear train 31 of a double pinion type, a forward clutch 32, and a reverse brake 33. The forward-backward travel changeover mechanism 30 may be configured to switch a transmission path of driving force of the engine 10 by controlling each of a state of the forward clutch 32 and a state of the reverse brake 33.

For example, when a D range (a forward traveling range) is selected, the forward clutch 32 may be engaged and the reverse brake 33 may be disengaged. This may allow rotation of the turbine shaft 25 to be transmitted to a primary shaft 51 as it is. The primary shaft 51 will be described later. This may allow the hybrid vehicle 1 to travel forward. When an R range (a backward traveling range) is selected, the forward clutch 32 may be disengaged and the reverse brake 33 may be engaged. This may cause the planetary gear train 31 to operate, and may thereby reverse a rotation direction of the primary shaft 51. This may allow the hybrid vehicle 1 to travel backward.

When an N range or the P range is selected, the forward clutch 32 and the reverse brake 33 may be disengaged. This may separate the turbine shaft 25 and the primary shaft 51 from each other, that is, this may block the transmission of the engine driving force, causing the forward-backward travel changeover mechanism 30 to be in a neutral state in which no power is transmitted to the primary shaft 51. Note that when power generation is performed in the P range, the forward clutch 32 may be engaged and the reverse brake 33 may be disengaged. This will be described later in further detail.

An operation of each of the forward clutch 32 and the reverse brake 33, i.e., whether each of the forward clutch 32 and the reverse brake 33 is engaged or disengaged, may be controlled by the TCU 74 to be described later, a valve body 75, and a manual valve 80.

The continuously variable transmission 50 may include the primary shaft 51 and a secondary shaft 55. The primary shaft 51 may be coupled to the turbine shaft 25 of the torque converter 20 via the forward-backward travel changeover mechanism 30. The secondary shaft 55 may be disposed in parallel with the primary shaft 51.

The primary shaft 51 may be provided with a primary pulley 52. The primary pulley 52 may include a fixed sheave 52a and a moving sheave 52b. The fixed sheave 52a may be coupled to the primary shaft 51. The moving sheave 52b may be opposed to the fixed sheave 52a, and may be slidably attached in a shaft direction of the primary shaft 51. The primary pulley 52 may be configured to change a cone surface spacing between the fixed sheave 52a and the moving sheave 52b, i.e., a pulley groove width. The secondary shaft 55 may be provided with a secondary pulley 53. The secondary pulley 53 may include a fixed sheave 53a and a moving sheave 53b. The fixed sheave 53a may be coupled to the secondary shaft 55. The moving sheave 53b may be opposed to the fixed sheave 53a, and may be slidably attached in a shaft direction of the secondary shaft 55. The secondary pulley 53 may be configured to change a pulley groove width.

A chain 54 may be wrapped around between the primary pulley 52 and the secondary pulley 53. The chain 54 may transmit driving force. A shifting ratio may be continuously varied by varying each of the pulley groove width of the primary pulley 52 and the pulley groove width of the secondary pulley 53 and thereby varying a ratio between a diameter of the chain 54 wrapped around the primary pulley 52 and a diameter of the chain 54 wrapped around the secondary pulley 53, i.e., a pully ratio. Here, where the diameter of the chain 54 wrapped around the primary pulley 52 is Rp, and the diameter of the chain 54 wrapped around the secondary pulley 53 is Rs, a shifting ratio i may be represented by the following expression: i=Rs/Rp. The shifting ratio i may thus be determined by dividing a primary pully rotational speed Np by a secondary pully rotational speed Ns (i=Np/Ns).

An oil pressure chamber 52c may be provided on a back surface side of the moving sheave 52b of the primary pulley 52. An oil pressure chamber 53c may be provided on a back surface side of the moving sheave 53b of the secondary pulley 53. The pully groove width of the primary pulley 52 may be set and changed by adjusting a primary oil pressure introduced to the oil pressure chamber 52c of the primary pulley 52. The pully groove width of the secondary pulley 53 may be set and changed by adjusting a secondary oil pressure introduced to the oil pressure chamber 53c of the secondary pulley 53.

A motor generator (an electric motor) 40 may be coupled to another end of the primary shaft 51 of the continuously variable transmission 50 to allow for torque transmission. The motor generator 40 may be, for example, a three-phase alternating-current synchronized motor. In the example embodiment, a motor generator including a permanent magnet as a rotator and a coil as a stator may be employed as the motor generator 40. The motor generator 40 may operate, for example but not limited to, as a driving force source that drives the vehicle. The motor generator 40 may serve as a generator, for example, upon regeneration. In one example, the motor generator 40 may include a coil as the rotator and a permanent magnet as the stator. In one example, an alternating-current induction motor, a direct-current motor, or any other kind of motor may be used as the motor generator 40, instead of the alternating-current synchronized motor.

The continuously variable transmission 50 may be provided with a mechanical oil pump 35. The mechanical oil pump 35 may pump oil to be used in the continuously variable transmission 50, the forward-backward travel changeover mechanism 30, the output clutch 61, the transfer clutch 64, the motor generator 40, and any other component. The mechanical oil pump 35 may suck the oil stored in an unillustrated oil pan, boost a pressure, and pump the oil to the continuously variable transmission 50, the forward-backward travel changeover mechanism 30, the output clutch 61, the transfer clutch 64, the motor generator 40, and any other component. For example, a trochoid pump, a vane pump, or any other pump may be used as the mechanical oil pump 35. The mechanical oil pump 35 may have a drive shaft coupled to each of the turbine shaft 25 and the primary shaft 51 via, for example, a chain or any other member to allow for torque transmission. That is, the mechanical oil pump 35 may be drivable by each of the engine 10 and the motor generator 40.

In addition, the continuously variable transmission 50 may be provided with an electric oil pump 36, in order to secure an oil pressure to be used, for example, when rotation (a discharge pressure) of the mechanical oil pump 35 decreases. Such a decrease in the rotation of the mechanical oil pump 35 may occur, for example, upon low-speed traveling with the engine 10 being stopped. The electric oil pump 36 may be driven by an electric motor, and may boost a pressure of oil stored in an oil pan and discharge the oil. Driving of the electric oil pump 36 may be controlled by the TCU 74.

As illustrated in FIGS. 2 and 3, a discharge outlet of the electric oil pump 36 may be coupled to (communicated with) a discharge outlet of the mechanical oil pump 35 via a first check valve 37. The first check valve 37 may open when the discharge pressure of the electric oil pump 36 is higher than the discharge pressure of the mechanical oil pump 35 (by a predetermined pressure). The first check valve 37 may include, for example, a spring and a ball. Alternatively, the first check valve 37 may include, for example, a spring and a rod-shaped valve body. The first check valve 37 may allow for flowing of the oil from the electric oil pump 36 side to the mechanical oil pump 35 side and may prevent flowing of the oil from the mechanical oil pump 35 side to the electric oil pump 36 side.

In addition, an oil passage 39 may be coupled to the discharge port of the electric oil pump 36 via a second check valve 38. The oil passage 39 may be in communication with the output clutch 61. The second check valve 38 may open when an oil pressure (a discharge pressure) on the electric oil pump 36 side is higher than an oil pressure on the output clutch 61 side (by a predetermined pressure). That is, the second check valve 38 may allow for flowing (supplying) of the oil from the electric oil pump 36 to the output clutch 61, but may prevent flowing (reversing) of the oil from the output clutch 61 to the electric oil pump 36.

Referring again to FIG. 1, the secondary shaft 55 of the continuously variable transmission 50 may be coupled to a counter shaft 60 via a reduction gear (a secondary reduction gear) 59. The reduction gear 59 may include a pair of gears, i.e., a reduction drive gear and a reduction driven gear. Driving force converted by the continuously variable transmission 50 may be transmitted to the counter shaft 60 via the reduction gear 59. The output clutch 61 and a parking gear 62 may be attached to the counter shaft 60. The parking gear 62 may be included in a parking mechanism. The parking mechanism may lock a wheel to prevent rotation of the wheel when the P range is selected. The parking mechanism may lock the parking gear 62 by engaging a parking ball in the parking gear 62, and may thereby bring the continuously variable transmission 50 into a parking state.

The output clutch 61 may be provided between the secondary shaft 55 of the continuously variable transmission 50 and the driving wheel. The output clutch 61 may interrupt or allow for torque transmission between the continuously variable transmission 50 (the engine 10 and the motor generator 40) and the driving wheel. For example, when the motor generator 40 is rotated by the engine 10 to generate power (when the P-range power generation is performed) while the vehicle is stopped, the output clutch 61 may be disengaged to decouple the engine 10 and the motor generator 40 from a wheel side. The output clutch 61 may therefore be engaged otherwise (e.g., while the vehicle is traveling). A control (engagement and disengagement) of the output clutch 61 may be performed by the TCU 74 which will be described later.

The counter shaft 60 may be coupled to a front drive shaft 66 via a counter gear 63. The counter gear 63 may include a pair of gears, i.e., a counter drive gear and a counter driven gear. Driving force transmitted to the counter shaft 60 may be transmitted to a front differential 67 via the counter gear 63 and the front drive shaft 66. The front differential 67 may be, for example, a bevel gear differential. Driving force from the front differential 67 may be transmitted to a left front wheel via a left front wheel drive shaft, and may be transmitted to a right front wheel via a right front wheel drive shaft.

The transfer clutch 64 may be interposed after the counter gear 63 (the counter drive gear) on the counter shaft 60 described above. The transfer clutch 64 may adjust driving force transmitted to a rear differential 69. Engagement force of the transfer clutch 64, that is, a ratio of torque distributed to rear wheels, may be controlled in accordance with, for example but not limited to, a driving state of four wheels, engine torque, or any other factor. The driving state of the four wheels may be, for example but not limited to, a slipping state of front wheels. The driving force transmitted to the counter shaft 60 may thus be distributed in accordance with the engagement force of the transfer clutch 64, and may also be transmitted to a rear wheel side.

For example, a rear end of the counter shaft 60 may be coupled to a propeller shaft 68 via a transfer gear 65. The propeller shaft 68 may extend to a rear side of the vehicle. The transfer gear 65 may include a pair of gears, i.e., a transfer drive gear and a transfer driven gear. Driving force transmitted to the counter shaft 60 and adjusted or distributed by the transfer clutch 64 may be transmitted from the transfer gear 65 (the transfer driven gear) to the rear differential 69 via the propeller shaft 68.

A left rear wheel drive shaft and a right rear wheel drive shaft may be coupled to the rear differential 69. Driving force from the rear differential 69 may be transmitted to a left rear wheel via the left rear wheel drive shaft, and may be transmitted to a right rear wheel via a right rear wheel drive shaft.

With the above-described configuration, the hybrid vehicle 1 may be able to drive the wheels or the vehicle by two kinds of power, i.e., the power of the engine 10 and the power of the motor generator 40. The hybrid vehicle 1 may also be able to perform deceleration regeneration and power generation with use of the motor generator 40. In addition, with the above-described configuration of the driving force transmission system, for example, when a shift lever 77 is operated to be in the D range, the forward clutch 32 may be engaged, and the engine driving force (and the driving force of the motor generator 40) may be inputted to the primary shaft 51 of the continuously variable transmission 50. Driving force converted by the continuously variable transmission 50 may be outputted from the secondary shaft 55, and may be transmitted to a front drive shaft 66 via the reduction gear 59, the counter shaft 60, and the counter gear 63. The driving force may be distributed by the front differential 67 to right and left, and the distributed driving force may be transmitted to right and left front wheels.

A portion of the driving force transmitted to the counter shaft 60 may be transmitted to the propeller shaft 68 via the transfer clutch 64 and the transfer gear 65. Here, when predetermined clutch torque is applied to the transfer clutch 64, driving force distributed in accordance with the clutch torque may be outputted to the propeller shaft 68. The driving force may be transmitted also to the rear wheels via the rear differential 69.

When the R range is selected, the forward clutch 32 may be disengaged and the reverse brake 33 may be engaged. This may reverse the rotation direction of the primary shaft 51. The torque flow after this may be similar to that in the above-described case of the D range. When the P range is selected, both the forward clutch 32 and the reverse brake 33 may be disengaged, and the turbine shaft 25 and the primary shaft 51 may be decoupled from each other, that is, transmission of the engine driving force may be blocked. Note that when the power generation is performed in the P range, the forward clutch 32 may be engaged, the reverse brake 33 may be disengaged, and the output clutch 61 may be disengaged. This may allow the motor generator 40 to be driven by the engine 10, and may prevent transmission of the driving force to the front wheels and the rear wheels. This will be described later in detail.

The engine 10 and the motor generator 40 that are the driving force sources of the vehicle, and the continuously variable transmission 50 may be generally controlled by a control system including, for example but not limited to, a hybrid vehicle control unit 70, the ECU 71, a power control unit 72, the TCU 74, and a vehicle dynamics control unit 76. Hereinafter, the hybrid vehicle control unit may be referred to as an "REV-CU", the power control unit may be referred to as a "PCU", and the vehicle dynamics control unit may be referred to as a "VDCU".

The REV-CU 70, the ECU 71, the PCU 72, the TCU 74, and the VDCU 76 may each include a microprocessor, an electrically erasable programmable read-only memory (EEPROM), a random access memory (RAM), a backup RAM, an input and output interface (UF), and any other component. The microprocessor may perform a calculation. The EEPROM may hold, for example but not limited to, a program that allows the microprocessor to execute each process. The RAM may hold various kinds of data including, without limitation, a calculation result. The backup RAM may hold contents stored in the RAM.

The HEV-CU 70, the ECU 71, the PCU 72, the TCU 74, and the VDCU 76 may be communicably coupled to each other via a controller area network (CAN) 100.

For example, various sensors may be coupled to the HEV-CU 70. The various sensors may include, for example but not limited to, an accelerator pedal sensor 81 and a resolver 82. The accelerator pedal sensor 81 may detect a depressed amount of an accelerator pedal, that is, an operation amount of the accelerator pedal. The resolver 82 may detect a rotational position (a rotational speed) of the motor generator 40. The HEV-CU 70 may receive various kinds of information from units including, without limitation, the ECU 71, the PCU 72, the TCU 74, and the VDCU 76 via the CAN 100. The various kinds of information may include, for example but not limited to, an engine speed, a primary pulley rotational speed, a secondary pulley rotational speed, an operation amount of a brake, a steering angle of a steering wheel, and a yaw rate.

The REV-CU 70 may generally control driving of the engine 10, the motor generator 40, and the continuously variable transmission 50 based on the various kinds of acquired information. For example, the HEV-CU 70 may determine a requested output of the engine 10, a torque command value of the motor generator 40, and a target shifting ratio of the continuously variable transmission 50 based on the various kinds of information including, without limitation, the operation amount of the accelerator pedal (requested driving force from a driver who drives the vehicle), the engine speed, a motor speed, the primary pulley rotational speed, the secondary pulley rotational speed, a driving state of the vehicle (e.g., the vehicle speed, the steering angle, etc.), and a state of charge (SOC) of a high voltage battery 73. The HEV-CU 70 may output the determined requested output, the determined torque command value, the determined target shifting ratio, etc. via the CAN 100. When the SOC of the high voltage battery 73 decreases to a predetermined value or lower in the P-range state, the REV-CU 70 may perform a control to allow the motor generator 40 to be driven by the engine 10 to perform power generation (the P-range power generation) to charge the high voltage battery 73. This will be described later in further detail.

The ECU 71 may determine the cylinder based on an output of the cam angle sensor described above, and may determine the engine speed (rotational speed) based on a change in the rotational position of the crankshaft 15. The change in the rotational position of the crankshaft 15 may be detected based on an output of the crank angle sensor 84. In addition, the ECU 71 may acquire various kinds of information based on detection signals supplied from the various sensors described above. Non-limiting examples of the various kinds of information may include an intake air amount, the operation amount of the accelerator pedal, an air-fuel ratio of the air-fuel mixture, and a water temperature. Based on the various kinds of acquired information and a requested output from the REV-CU 70, the ECU 71 may control, for example but not limited to, an injection quantity, an ignition timing, and various devices including, without limitation, an electronically controlled throttle valve, thereby controlling the engine 10. Note that the ECU 71 may cause the engine 10 to operate when the P-range power generation is to be performed.

In addition, the ECU 71 may calculate engine torque (output torque) of the engine 10 based on, for example but not limited to, the intake air amount detected by the air flow meter 83 and the engine speed. The ECU 71 may transmit the pieces of information including, without limitation, the engine speed (rotational speed) and the engine torque to a unit such as the TCU 74 or the HEV-CU 70 via the CAN 100.

The PCU 72 may drive the motor generator 40 via an inverter 72*a* based on the torque command value supplied from the HEV-CU 70. Here, the inverter 72*a* may convert the direct-current power of the high voltage battery 73 into three-phase alternating-current power, and may supply the converted power to the motor generator 40. For example, upon regeneration or the P-range power generation, the inverter 72*a* may convert the alternating-current voltage generated by the motor generator 40 into a direct-current voltage to charge the high voltage battery 73.

Devices including, without limitation, a brake switch 89 and a brake fluid pressure sensor 90 may be coupled to the VDCU 76. The brake switch 89 may detect whether a brake pedal is depressed. The brake fluid pressure sensor 90 may detect a master cylinder pressure (a brake oil pressure) of a brake actuator. A device such as a wheel speed sensor 91 may also be coupled to the VDCU 76. The wheel speed sensor 91 may detect a rotational speed of each of the wheels of the vehicle, i.e., the vehicle speed.

The VDCU 76 may perform braking of the vehicle by driving the brake actuator in accordance with an operation amount (a depressed amount) of the brake pedal. In addition, the VDCU 76 may secure vehicle stability upon turning by suppressing a lateral slip. To suppress the lateral slip, the VDCU 76 may detect vehicle behavior with use of the various sensors, and thereby perform automatic-pressurization brake control and a torque control of components including the engine 10. The above-described various sensors may include, for example, the wheel speed sensor 91, a steering angle sensor, an acceleration sensor, and a yaw rate sensor. In addition, the VDCU 76 may perform both an antilock brake system (ABS) operation and a traction control system (TCS) operation. The ABS operation may prevent wheel lock and appropriately maintain a slip ratio of each of the wheels. This may secure direction stability and steering property upon braking, and may achieve appropriate braking force. The wheel lock may occur, for example, when braking is performed suddenly or on a slippery road surface. The TCS operation may suppress idling of the driving wheel to secure vehicle stability and acceleration property upon starting or acceleration. The idling of the driving wheel may be caused, for example, by a slippery road surface or excessively great driving force.

The VDCU 76 may transmit information including, without limitation, the detected braking information (braking operation information) and the wheel speed (the vehicle speed) to units including, without limitation, the TCU 74, the HEV-CU 70, and the ECU 71 via the CAN 100. Non-limiting examples of the detected braking information may include braking information regarding the brake switch 89 and the brake fluid pressure.

Sensors including, without limitation, a primary pulley rotation sensor 85 and a secondary pulley rotation sensor 86 may be coupled to the TCU 74. The primary pulley rotation sensor 85 may detect a rotational speed of the primary pulley 52. The secondary pulley rotation sensor 86 may detect a rotational speed of the secondary pulley 53. The rotational speed of the secondary pulley 53 may correspond to the vehicle speed. In addition, sensors including, without limitation, the turbine rotation sensor 87 and an output clutch rotation sensor 88 may also be coupled to the TCU 74.

The TCU 74 may receive information including, without limitation, the engine torque from the ECU 71 via the CAN 100. The TCU 74 may receive information including, without limitation, motor torque and the operation amount of the accelerator pedal from the HEV-CU 70 via the CAN 100. The TCU 74 may receive information including, without limitation, the vehicle speed and braking operation information from the VDCU 76 via the CAN 100.

The TCU 74 may continuously change the shifting ratio of the continuously variable transmission 50 based on the various pieces of acquired information (the driving state of the vehicle) and the target shifting ratio from the HEV-CU 70.

Upon continuously changing the shifting ratio of the continuously variable transmission 50, the TCU 74 may control driving of a solenoid valve included in the valve body 75 to adjust an oil pressure supplied to the oil pressure chamber 52*c* of the primary pulley 52 and the oil pressure chamber 53*c* of the secondary pulley 53, thereby changing the shifting ratio of the continuously variable transmission 50.

Further, as illustrated in FIGS. 2 and 3, the TCU 74 may control driving of a linear solenoid 751 and a control valve 752 included in the valve body 75 to adjust an amount of the oil (an oil pressure) supplied to and discharged from the forward clutch 32 or the reverse brake 33, thereby engaging and disengaging the forward clutch 32 or the reverse brake 33. Whether to supply the oil to (or discharge the oil from) the forward clutch 32 side and whether to supply the oil to (or discharge the oil from) the reverse brake 33 side may be switched by the manual valve 80. The manual valve 80 may be configured to move in conjunction with the shift lever 77.

Here, for example, the shift lever (select lever) 77 may be provided, for example, on a floor (a center console) of the vehicle. The shift lever 77 may receive an operation, performed by the driver who drives the vehicle, of selectively switching the operation state (the range) of the continuously variable transmission 50. A range switch 79 may be attached to the shift lever 77. The range switch 79 may be coupled to the shift lever 77 to move in conjunction with the shift lever 77. The range switch 79 may detect a selected position of the shift lever 77. The range switch 79 may be coupled to the TCU 74. The selected position of the shift lever 77 detected by the range switch 79 may be read by the TCU 74. The shift lever 77 may allow for selective switching between a drive "D" range, a manual "M" range, a parking "P" range, a reverse "R" range, a neutral "N" range, etc. Note that in one example, a switch selection mechanism may be used instead of the shift lever 77.

When the shift lever 77 is operated and the D range (the forward traveling range) is selected, the manual valve 80 may move to supply the oil to an oil pressure chamber of the forward clutch 32 and to discharge the oil from an oil pressure chamber of the reverse brake 33. This may bring the forward clutch 32 into an engaged state and bring the reverse brake 33 into a disengaged state, allowing the vehicle to travel forward. When the shift lever 77 is operated and the R range (the backward traveling range) is selected, the manual valve 80 may move to supply the oil to the oil pressure chamber of the reverse brake 33 and to discharge the oil from the oil pressure chamber of the forward clutch 32. This may bring the reverse brake 33 into an engaged state and bring the forward clutch 32 into a disengaged state, allowing the vehicle to travel backward.

When the shift lever 77 is operated and the N range or the P range is selected, the oil may be discharged from each of the oil pressure chamber of the forward clutch 32 and the oil pressure chamber of the reverse brake 33. This may bring each of the forward clutch 32 and the reverse brake 33 into the disengaged state, i.e., may block transmission of the engine driving force, bringing the continuously variable transmission 50 into a neutral state. However, when the power generation is performed in the P range, the oil may be supplied to the oil pressure chamber of the forward clutch 32, bringing the forward clutch 32 into the engaged state. Here, the manual valve 80 may be configured to supply the oil (the oil pressure) to the forward clutch 32 when the P range is selected.

Further, the TCU 74 may control driving of a linear solenoid 754 and a control valve 755 included in the valve body 75 described above to adjust an amount of the oil (an oil pressure) supplied to and discharged from the output clutch 61, thereby controlling engagement and disengagement of the output clutch 61. Note that the TCU 74 may engage the output clutch 61 in the P range, and may disengage the output clutch 61 when the power generation is performed in the P range (see FIG. 4). When the power generation is being performed in the P range and switching to the R range is performed (i.e., the shift operation is performed), the TCU 74 may drive the electric oil pump 36 to supply the oil to the output clutch 61 through the oil passage 39. Note that the TCU 74 may stop the driving of the electric oil pump 36 when an oil pressure chamber of the output clutch 61 is filled with the oil, the oil pressure on the output clutch 61 side is increased, and the second check valve 38 is closed.

In addition, the TCU 74 may control driving of a solenoid valve included in the above-described valve body 75 to adjust an oil pressure supplied to the transfer clutch 64 (that is, to adjust engagement force), thereby adjusting a distribution ratio of driving force transmitted to the rear wheels.

As described above, and as described in FIG. 4, in the P-range state, the lock-up clutch 24 may be disengaged, the forward clutch 32 may be disengaged, the output clutch 61 may be engaged, the transfer clutch 64 may be engaged, and the reverse brake 33 may be disengaged. In the P-range power generation state, the lock-up clutch 24 may be engaged, the forward clutch 32 may be engaged, the output clutch 61 may be disengaged, the transfer clutch 64 may be engaged, and the reverse brake 33 may be disengaged. In the D-range state, the lock-up clutch 24 may be engaged based on the vehicle speed, the forward clutch 32 may be engaged, the output clutch 61 may be engaged, the transfer clutch 64 may be engaged, and the reverse brake 33 may be disengaged. In the R-range state, the lock-up clutch 24 may be disengaged, the forward clutch 32 may be disengaged, the output clutch 61 may be engaged, the transfer clutch 64 may be engaged, and the reverse brake 33 may be engaged.

Accordingly, when transfer is made from the P-range state to the D-range state, simply, engagement of the forward clutch 32 (one system) may be to be performed. When transfer is made from the P-range state to the R-range state, simply, engagement of the reverse brake 33 (one system) may be to be performed. When transfer is made from the P-range power generation state to the D-range state, simply, engagement of the output clutch 61 (one system) may be to be performed. In contrast, when transfer is made from the P-range power generation state to the R-range state, engagement of the reverse brake 33 and the output clutch 61 (two systems) may be to be performed.

Here, for example, the HEV-CU 70, the TCU 74, and the ECU 71 (hereinafter, sometimes referred to as "the HEV-CU 70, etc.") may cooperate to allow for power generation using the motor generator 40 in the P range (the P-range power generation), and to prevent occurrence of a delay in response to the shift operation even if the switching to the R range is performed (the shift operation is performed) during the P-range power generation. The HEV-CU 70, the TCU 74, and the ECU 71 may perform such an operation by microprocessors executing a program stored in each storage such as the EEPROM. In one embodiment, the HEV-CU 70, the TCU 74, and the ECU 71 may serve as a "control unit".

When the state of charge (SOC) of the high voltage battery 73 decreases to the predetermined value or lower in the P range, the HEV-CU 70, etc. may disengage the output clutch 61 and engage the forward clutch 32 (see FIG. 4), and may cause the engine 10 to operate to drive the motor generator 40 as a generator (to perform power generation). In addition, at this time (when the power generation is performed in the P range), the HEV-CU 70, etc. may engage the lock-up clutch 24 and engage the transfer clutch 64 (see FIG. 4).

Note that at the time of the P-range power generation, the HEV-CU 70, etc. may automatically turn on an electric parking brake (EPB) and may lock the parking mechanism (the parking gear 62) (see FIG. 4).

When the state of charge (SOC) of the high voltage battery 73 becomes a predetermined value or higher, i.e., when the high voltage battery 73 is completely charged, the HEV-CU 70, etc. may end the P-range power generation and may allow for a return to the normal P-range state (in which the forward clutch 32 is disengaged, the lock-up clutch 24 is disengaged, and the output clutch 61 is engaged) (see FIG. 4).

When the switching to the R range is performed, i.e., when the shift operation is performed, while the power generation is being performed in the P range, the HEV-CU 70, etc. (e.g. the TCU 74) may end the P-range power generation, and may drive the electric oil pump 36 to supply the oil to the output clutch 61 through the oil passage 39. Thus, the output clutch 61 may receive the oil supplied from the electric oil pump 36 in addition to the oil supplied from the mechanical oil pump 35.

When the oil pressure chamber of the output clutch 61 is filled with the oil, the oil pressure on the output clutch 61 side increases, and the second check valve 38 is closed, the HEV-CU 70, etc. (e.g., the TCU 74) may stop the driving of the electric oil pump 36.

An amount of the oil that leaks (drops) from the oil pressure chamber of the output clutch 61 may have a correlation with a time from the start of the power generation in the P range to the switching to the R range. For this reason, the HEV-CU 70, etc. (e.g., the TCU 74) may measure a time from the start of the power generation in the P range to the switching to the R range, may set (control) a driving time of the electric oil pump 36 in accordance with the measured time, and may drive the electric oil pump 36 until the set driving time elapses. That is, the REV-CU 70, etc. (e.g., the TCU 74) may estimate the amount of the oil that leaks (drops) from the oil pressure chamber of the output clutch 61, and may drive the electric oil pump 36 in accordance with the estimated amount.

Figure 5:
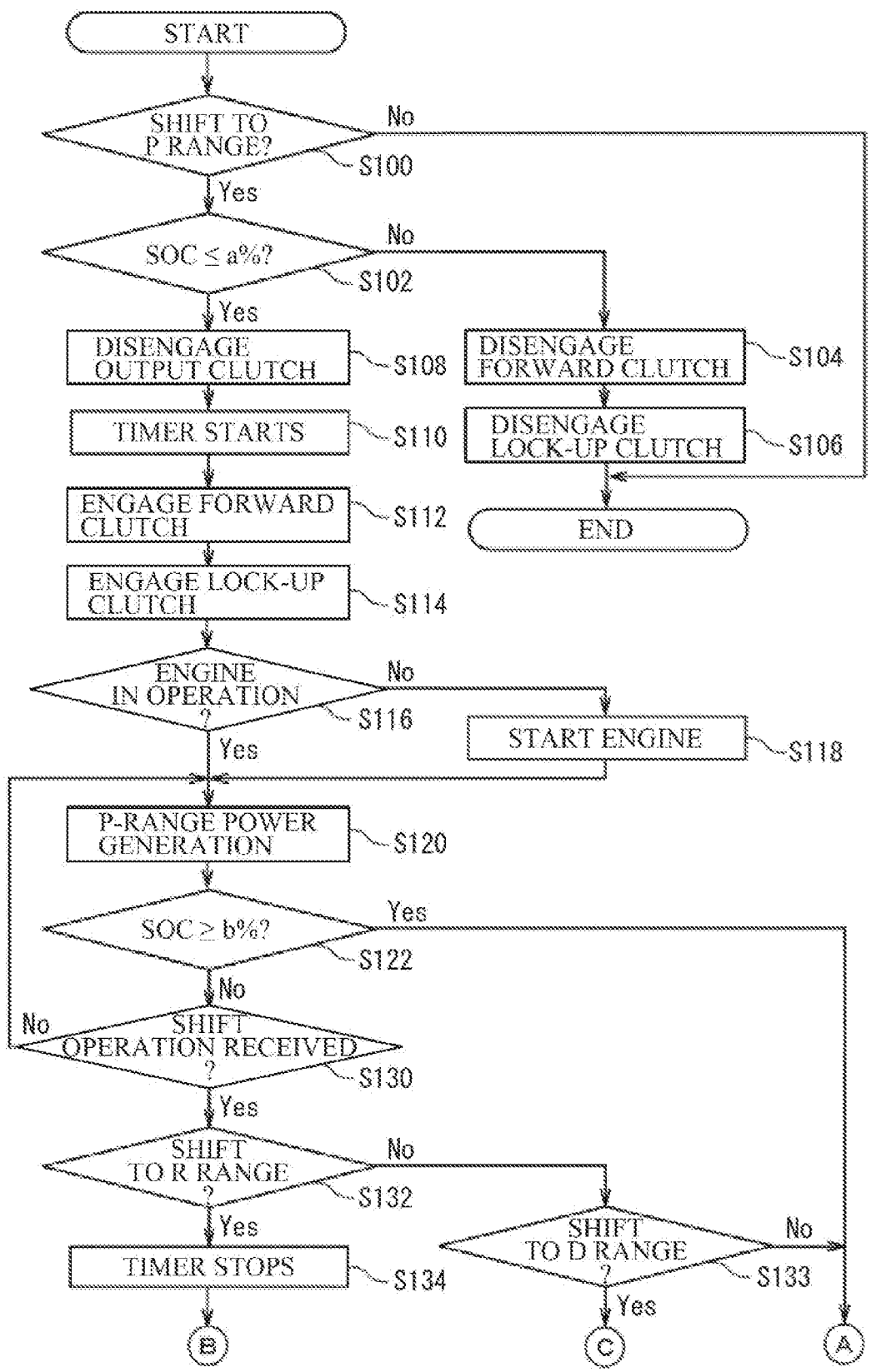
FIG. 5 is a first flowchart illustrating a process procedure of a P-range power generation process in the hybrid vehicle according to the example embodiment.
Figure 6:
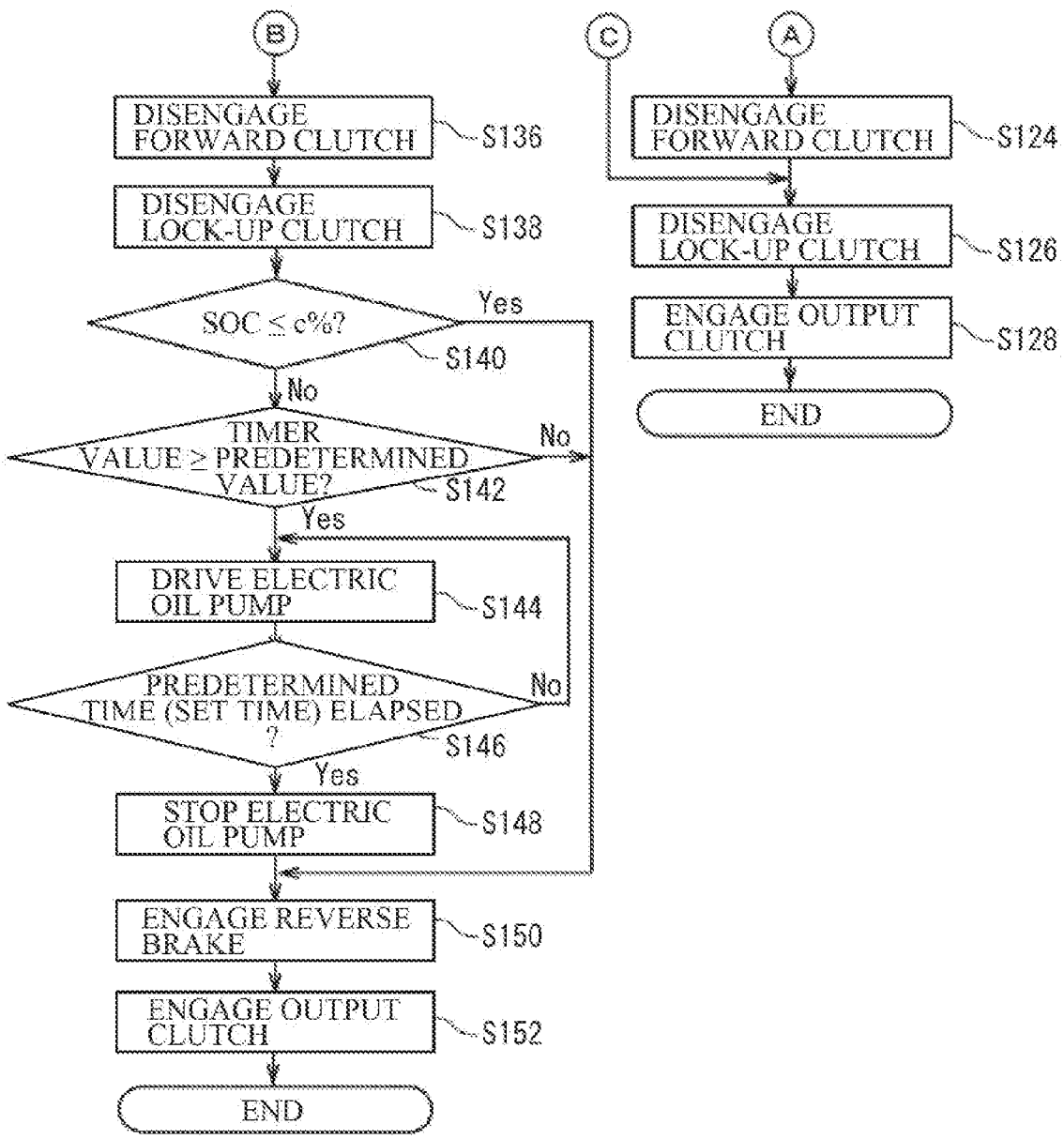
FIG. 6 is a second flowchart illustrating the process procedure of the P-range power generation process in the hybrid vehicle according to the example embodiment.

Next, an operation of the hybrid vehicle 1 will be described with reference to FIGS. 5 and 6. FIGS. 5 and 6 are each a flowchart illustrating a process procedure of a P-range power generation process in the hybrid vehicle 1. This process may be repeatedly executed at predetermined timings, for example, by the HEV-CU 70, the ECU 71, and the TCU 74.

In step S100, a determination may be performed as to whether shifting to the P range has been performed. If the shifting to the P range has been performed (step S100: Yes), the process may proceed to step S102. If the shifting to the P range has not been performed (step S100: No), the operation may once exit the process.

In step S102, a determination may be performed as to whether the SOC of the high voltage battery 73 is the predetermined value (a %) or lower. If the SOC is higher than the predetermined value (a %) (step S102: No), the forward clutch 32 may be disengaged (step S104), and the lock-up clutch 24 may be disengaged (step S106). That is, transfer to the normal P-range state may be made. Thereafter, the operation may once exit the process. If the SOC is the predetermined value (a %) or lower (step S102: Yes), the process may proceed to step S108.

In step S108, the output clutch 61 may be disengaged. Thereafter, in step S110, a timer (t1) may be started. The timer (t1) may measure a time from the start of the power generation in the P range to the switching to the R range.

Thereafter, the forward clutch 32 may be engaged in step S112, and the lock-up clutch 24 may be engaged in step S114.

Thereafter, in step S116, a determination may be performed as to whether the engine 10 is in operation. If the engine 10 is not in operation (step S116: No), the engine 10 may be started in step S118. Thereafter, the process may proceed to step S120. If the engine 10 is already in operation (step S116: Yes), the process may proceed to step S120.

In step S120, the P-range power generation may be performed. Thereafter, in step S122, a determination may be performed as to whether the SOC of the high voltage battery 73 is a predetermined value (b %) or higher (i.e., whether the high voltage battery 73 has been completely charged). If the SOC is the predetermined value (b %) or higher (step S122: Yes), the forward clutch 32 may be disengaged (step S124), the lock-up clutch 24 may be disengaged (step S126), and the output clutch 61 may be engaged (step S128). That is, transfer to the normal P-range state may be made. Thereafter, the operation may once exit the process. If the SOC is lower than the predetermined value (b %) (step S122: No), the process may proceed to step S130.

In step S130, a determination may be performed as to whether the shift operation has been received. If the shift operation has not been received (step S130: No), the process may return to step S120, and the P-range power generation may be continued. If the shift operation has been received (step S130: Yes), the process may proceed to step S132.

In step S132, a determination may be performed as to whether the shifting to the R range has been performed. If shifting to a range other than the R range has been performed (step S132: No), the process may proceed to step S133. If the shifting to the R range has been performed (step S132: Yes), the process may proceed to step S134.

In step S133, a determination may be performed as to whether shifting to the D range has been performed. If shifting to a range other than the D range has been performed (step S133: No), the process may proceed to step S124 described above, and transfer to the normal P-range state may once be made. Thereafter, transfer to the selected shift state may be made. If the shifting to the D range has been performed (step S133: Yes), the process may proceed to step S126 described above. Thus, the lock-up clutch 24 may be disengaged (step S126), and the output clutch 61 may be engaged (step S128). That is, transfer to the D-range state may be made. Thereafter, the operation may once exit the process.

In step S134, the timer (t1) may be stopped that measures the time from the start of the power generation in the P range to the switching to the R range. Thereafter, the forward clutch 32 may be disengaged (step S136), and the lock-up clutch 24 may be disengaged (step S138).

In the following step S140, a determination may be performed as to whether the SOC of the high voltage battery 73 is a predetermined value (c %) or lower. If the SOC is the predetermined value (c %) or lower (step S140: Yes), the process may proceed to step S150. If the SOC is higher than the predetermined value (c %) (step S140: No), the process may proceed to step S142.

In step S142, a determination may be performed as to whether a value of the timer (t1) is a predetermined value or greater. If the value of the timer (t1) is less than the predetermined value (step S142: No), the process may proceed to step S150. If the value of the timer (t1) is the predetermined value or greater (step S142: Yes), the process may proceed to S144.

In step S144, the electric oil pump 36 may be driven at a predetermined speed (that is, the oil may be supplied to the output clutch 61). Thereafter, in step S146, a determination may be performed as to whether a predetermined time (a set time) has elapsed from a start of the driving of the electric oil pump 36. If the predetermined time (the set time) has not elapsed from the start of the driving of the electric oil pump 36 (step S146: No), the process may return to step S144. In step S144, the electric oil pump 36 may be driven. If the predetermined time (the set time) has elapsed from the start of the driving of the electric oil pump 36 (step S146: Yes), the process may proceed to step S148.

In step S148, the driving of the electric oil pump 36 may be stopped. Thereafter, in step S150, the reverse brake 33 may be engaged. Further, in step S152, the output clutch 61 may be engaged. That is, transfer to the backward traveling state may be made. Thereafter, the operation may once exit the process.

As described above in detail, according to the example embodiment, employed may be a configuration in which the oil (the oil pressure) is allowed to be supplied to the forward clutch 32 when the P range is selected. When the state of charge (SOC) of the high voltage battery 73 decreases to the predetermined value or lower in the P range, the output clutch 61 may be disengaged, the forward clutch 32 may be engaged, and the engine 10 may be caused to operate to drive the motor generator 40 as a generator (to perform the power generation). When the switching to the R range is performed (the shift operation is performed) while the power generation is being performed in the P range, the electric oil pump 36 may be driven, and the oil may be supplied to the output clutch 61 through the oil passage 39. This makes it possible to cause the electric oil pump 36 to assist oil supply to (engagement of) one of the two clutch systems which are to be engaged (to receive the oil) to allow for the switching to the R range. The two clutch systems described above may be, for example, the output clutch 61 and the reverse brake 33. In the example embodiment, the electric oil pump 36 may assist the oil supply to the output clutch 61. As a result, it is possible to allow for the power generation using the motor generator 40 in the P range, i.e., the P-range power generation, and to prevent occurrence of a delay in response to the shift operation even if the switching to the R range is performed (the shift operation is performed) during the P-range power generation.

According to the example embodiment, the second check valve 38 may be provided. The second check valve 38 may be interposed in the oil passage 39. The second check valve 38 may open when the oil pressure (the discharge pressure) on the electric oil pump 36 side is higher than the oil pressure on the output clutch 61 side (by a predetermined pressure). That is, it is possible to allow the oil to flow (to be supplied) from the electric oil pump 36 to the output clutch 61, while it is possible prevent the oil from flowing (reversing) from the output clutch 61 into the electric oil pump 36. Accordingly, after the engagement of the output clutch 61 is completed, closing of the second check valve 38 may allow for prevention of excessive oil supply from the electric oil pump 36.

The amount of the oil that leaks (drops) from the oil pressure chamber of the output clutch 61 may have a correlation with the time from the start of the power generation in the P range to the switching to the R range. According to the example embodiment, the time from the start of the power generation in the P range to the switching to the R range may be measured. The driving time of the electric oil pump 36 may be set in accordance with the measured time. The electric oil pump 36 may be driven until the set driving time elapses. This makes it possible to estimate the amount of the oil that leaks (drops) from the oil pressure chamber of the output clutch 61, and may drive the electric oil pump 36 in accordance with the estimated amount. Accordingly, it is possible to prevent unnecessary driving of the electric oil pump 36, in other words, to prevent an excessive operation of the electric oil pump 36. It is therefore possible to suppress power consumption.

According to the example embodiment, the lock-up clutch 24 may be engaged when the power generation is performed in the P range. This allows for direct coupling between the engine 10 and the motor generator 40, allowing for more efficient power generation.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof. For example, in the example embodiment described above, communication between the electric oil pump 36 and the output clutch 61 may be allowed by the oil passage 39. However, communication between the electric oil pump 36 and the reverse brake 33 (a downstream side of the control valve 752), instead of the output clutch 61, may be allowed by an oil passage.

In the example embodiment described above, the time from the start of the power generation in the P range to the switching to the R range may be measured, the driving time of the electric oil pump 36 may be set in accordance with the measured time, and the electric oil pump 36 may be driven until the set driving time elapses. In one example, in addition to the above-described operation, if the measured time reaches a predetermined time or greater during the measuring, the electric oil pump 36 may be temporarily driven (the oil may be supplied to an extent that does not cause engagement of the clutch), and the measured time may be reset (restarted).

In one example, employed may be a configuration in which, when the P-range power generation is performed, the reverse brake 33 is engaged instead of the forward clutch 32. For example, the following configuration may be employed. The manual valve 80 may be configured, when the P range is selected, to supply the oil (the oil pressure) to the reverse brake 33, instead of the forward clutch 32. The oil passage may allow for communication between the electric oil pump 36 and the output clutch 61 or the forward clutch 32, instead of allowing for communication between the electric oil pump 36 and the output clutch 61 or the reverse brake 33. The HEV-CU 70, etc. may be configured to, when the switching to the D range is performed (when the shift operation is performed) while the power generation is performed in the P range, drive the electric oil pump 36 and supply the oil to the output clutch 61 or the forward clutch 32 through the oil passage.

In the example embodiment described above, employed may be the configuration (the system configuration) in which the HEV-CU 70, the ECU 71, the TCU 74, the VDCU 76, etc. are communicably coupled to each other via the CAN 100. However, the system configuration is not limited to that in the example embodiment described above. In one example, the ECU 71 that controls the engine 10 and the TCU 74 that controls the continuously variable transmission 50 may be configured as an integrated piece of hardware.

Each of the REV-CU 70, the ECU 71, the TCU 74, and the VDCU 76 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the HEV-CU 70, the ECU 71, the TCU 74, and the VDCU 76 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the HEV-CU 70, the ECU 71, the TCU 74, and the VDCU 76 illustrated in FIG. 1.

The invention claimed is:
1. A hybrid vehicle comprising:
 a forward-backward travel changeover mechanism comprising a forward clutch and a reverse brake;
 a continuously variable transmission comprising a primary shaft and a secondary shaft;
 an engine coupled to a first end of the primary shaft of the continuously variable transmission via the forward-backward travel changeover mechanism;
 a motor generator coupled to a second end of the primary shaft of the continuously variable transmission;
 an output clutch;

a driving wheel coupled to the secondary shaft of the continuously variable transmission via the output clutch;
a mechanical oil pump configured to be driven by the engine and the motor generator and to boost a pressure of oil and discharge the oil;
an electric oil pump configured to be driven by an electric motor and to discharge the oil through a first check valve, the first check valve being configured to open when a discharge pressure of the electric oil pump is higher than a discharge pressure of the mechanical oil pump;
a manual valve configured to switch supply of the oil to the forward clutch and the reverse brake in accordance with a shift operation state;
an oil passage configured to allow for communication between the electric oil pump and the output clutch or the reverse brake; and
a control unit configured to control driving of the engine, driving of the motor generator, driving of the electric oil pump, engagement and disengagement of the forward clutch, engagement and disengagement of the reverse brake, and engagement and disengagement of the output clutch, wherein
the manual valve is configured to supply the oil to the forward clutch when a parking range is selected, and
the control unit is configured to:
when a state of charge of a high voltage battery decreases to a predetermined value or lower in the parking range, disengage the output clutch, engage the forward clutch, and cause the engine to operate to drive the motor generator as a generator; and
when a backward traveling range is selected while power generation is being performed in the parking range, drive the electric oil pump, and supply the oil to the output clutch or the reverse brake through the oil passage.

2. The hybrid vehicle according to claim 1, further comprising a second check valve interposed in the oil passage, the second check valve being configured to open when an oil pressure on a side of the electric oil pump is higher than an oil pressure on a side of the output clutch or the reverse brake.

3. The hybrid vehicle according to claim 2, wherein the control unit is configured to
measure a time from a start of the power generation in the parking range to switching to the backward traveling range,
set a driving time of the electric oil pump in accordance with the measured time, and drive the electric oil pump until the set driving time elapses.

4. The hybrid vehicle according to claim 3, further comprising:
a torque converter disposed between the engine and the forward-backward travel changeover mechanism, and comprising a lock-up clutch; and
a transfer clutch disposed at a position that is after the output clutch and between the output clutch and a driven wheel, wherein
the control unit is configured to engage the lock-up clutch and engage the transfer clutch when the power generation is performed in the parking range.

5. A hybrid vehicle comprising:
a forward-backward travel changeover mechanism comprising a forward clutch and a reverse brake;
a continuously variable transmission comprising a primary shaft and a secondary shaft;
an engine coupled to a first end of the primary shaft of the continuously variable transmission via the forward-backward travel changeover mechanism;
a motor generator coupled to a second end of the primary shaft of the continuously variable transmission;
an output clutch;
a driving wheel coupled to the secondary shaft of the continuously variable transmission via the output clutch;
a mechanical oil pump configured to be driven by the engine and the motor generator and to boost a pressure of oil and discharge the oil;
an electric oil pump configured to be driven by an electric motor and to discharge the oil through a first check valve, the first check valve being configured to open when a discharge pressure of the electric oil pump is higher than a discharge pressure of the mechanical oil pump;
a manual valve configured to switch supply of the oil to the forward clutch and the reverse brake in accordance with a shift operation state;
an oil passage configured to allow for communication between the electric oil pump and the output clutch or the reverse brake; and
circuitry configured to control driving of the engine, driving of the motor generator, driving of the electric oil pump, engagement and disengagement of the forward clutch, engagement and disengagement of the reverse brake, and engagement and disengagement of the output clutch, wherein
the manual valve is configured to supply the oil to the forward clutch when a parking range is selected, and
the circuitry configured to:
when a state of charge of a high voltage battery decreases to a predetermined value or lower in the parking range, disengage the output clutch, engage the forward clutch, and cause the engine to operate to drive the motor generator as a generator; and
when a backward traveling range is selected while power generation is being performed in the parking range, drive the electric oil pump, and supply the oil to the output clutch or the reverse brake through the oil passage.

6. A hybrid vehicle comprising:
a forward-backward travel changeover mechanism comprising a forward clutch and a reverse brake;
a continuously variable transmission comprising a primary shaft and a secondary shaft;
an engine coupled to a first end of the primary shaft of the continuously variable transmission via the forward-backward travel changeover mechanism;
a motor generator coupled to a second end of the primary shaft of the continuously variable transmission;
an output clutch;
a driving wheel coupled to the secondary shaft of the continuously variable transmission via the output clutch;
a mechanical oil pump configured to be driven by the engine and the motor generator and to boost a pressure of oil and discharge the oil;
an electric oil pump configured to be driven by an electric motor and to discharge the oil through a first check valve, the first check valve being configured to open when a discharge pressure of the electric oil pump is higher than a discharge pressure of the mechanical oil pump;

a manual valve configured to switch supply of the oil to the forward clutch and the reverse brake in accordance with a shift operation state;
an oil passage configured to allow for communication between the electric oil pump and the output clutch or the reverse brake; and
a control unit configured to control driving of the engine, driving of the motor generator, driving of the electric oil pump, engagement and disengagement of the forward clutch, engagement and disengagement of the reverse brake, and engagement and disengagement of the output clutch, wherein
the manual valve is configured to supply the oil to the reverse brake when a parking range is selected, and
the control unit is configured to:
when a state of charge of a high voltage battery decreases to a predetermined value or lower in the parking range, disengage the output clutch, engage the reverse brake, and cause the engine to operate to drive the motor generator as a generator; and
when a forward traveling range is selected while power generation is being performed in the parking range, drive the electric oil pump, and supply the oil to the output clutch or the forward clutch through the oil passage.

7. The hybrid vehicle according to claim 6, further comprising a second check valve interposed in the oil passage, the second check valve being configured to open when an oil pressure on a side of the electric oil pump is higher than an oil pressure on a side of the output clutch or the forward clutch.

8. The hybrid vehicle according to claim 7, further comprising:
a torque converter disposed between the engine and the forward-backward travel changeover mechanism, and comprising a lock-up clutch; and
a transfer clutch disposed at a position that is after the output clutch and between the output clutch and a driven wheel, wherein
the control unit is configured to engage the lock-up clutch and engage the transfer clutch when the power generation is performed in the parking range.

* * * * *